United States Patent
Park (10) Patent No.: US 8,504,924 B2
(45) Date of Patent: Aug. 6, 2013

(54) METHOD AND SYSTEM FOR PROVIDING SOCIAL NETWORK SERVICE INTERLOCKING WITH PHONE BOOK OF PORTABLE TERMINAL

(75) Inventor: Sang-Min Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 12/908,330

(22) Filed: Oct. 20, 2010

(65) Prior Publication Data

US 2011/0110513 A1   May 12, 2011

(30) Foreign Application Priority Data

Nov. 11, 2009 (KR) .................. 10-2009-0108705

(51) Int. Cl.
*G06F 3/00* (2006.01)
(52) U.S. Cl.
USPC .............. 715/739; 715/749; 707/E17.001; 709/227
(58) Field of Classification Search
USPC ............ 715/739, 749; 709/226, 227; 707/705
See application file for complete search history.

(56) References Cited

U.S. PATENT DOCUMENTS

| | | | | |
|---|---|---|---|---|
| 8,195,656 | B2 * | 6/2012 | Grasset | 707/732 |
| 2008/0270613 | A1 * | 10/2008 | Bamford et al. | 709/227 |
| 2010/0238919 | A1 * | 9/2010 | Froelich | 370/352 |
| 2010/0287281 | A1 * | 11/2010 | Tirpak | 709/226 |
| 2011/0035673 | A1 * | 2/2011 | Chou et al. | 715/739 |
| 2012/0016904 | A1 * | 1/2012 | Mahajan et al. | 707/769 |

* cited by examiner

*Primary Examiner* — Creighton Smith
(74) *Attorney, Agent, or Firm* — Jefferson IP Law, LLP (57) ABSTRACT

A method and system of providing a Social Network Service (SNS) interlocking with a phone book of a portable terminal are provided. The method includes searching for an item that corresponds to subscriber information of the SNS, extracting information that corresponds to the searched item from the phone book of the portable terminal, converting the information into a specified data format, transmitting the information to an SNS server, searching for values that coincide with the received information converted into the specified data format, converting the searched values and corresponding SNS IDs into the specified data format, and transmitting the converted values and the corresponding SNS IDs to the portable terminal.

20 Claims, 8 Drawing Sheets

Friend Addition                                                  ☒

| Friend Addition | Friend Search |

Please input ID and friend request message of a friend desired to be added as a MSN messenger friend, and press "Friend Request" button ID [james0905] @ [nate.com ▼]

Request Message: [I am a fan of Hong Gil Dong.
Please register as a friend.]

The addition-requested friend is added to [other ▼] group

☑ Add friend and store in address book

[Friend request] [Cancel]

Friend Search                                                    ☒

Please select option (cellular phone number, ID, name) desired to be searched for, input friend information, and seek for friend by clicking "search".

[H.N ▼] [ ▼] [ ] [ ]

The following user has been searched for.  [Search]

Please select a person desired to be added as a friend, input friend request message, and then click "next" button Request Message: [Please input]

[Back] [ ] [ ] [Cancel]

```
<?xml version="1.0" encoding="euc-kr"?>
<list>
    <person>
        <name sex="1">abc</name>
        <tel>011-222-333</tel>
        <addr>Kumi hwangsang</addr>
        <addr>widaasx@gmail.com</addr>
        <num>4</num>
    </person>
    <person>
        <name sex="1">abc</name>
        <tel>017-225-4024</tel>
        <addr>seoul bangbae dong</addr>
        <addr>wixad@gmail.com</addr>
        <num>4</num>
    </person>
    <person>
        <name sex="1">bcd</name>
        <tel>111-111-1111</tel>
        <addr>Kumi indong</addr>
        <addr>widsx@gmail.com</addr>
        <num>4</num>
    </person>
    <person>
        <name sex="1">efg</name>
```

FIG.6A

```
<?xml version="1.0" encoding="euc-kr"?>
<list>
    <person>
        <name sex="1">abc</name>
        <tel>011-222-333</tel>
        <addr>Kumi hwangsang</addr>
        <addr>widaasx@gmail.com</addr>
        <flickerID>jodko</flickerID>
        <num>5</num>
    </person>
    <person>
        <name sex="1">abc</name>
        <tel>017-225-4024</tel>
        <addr>seoul bangbae dong</addr>
        <addr>wixad@gmail.com</addr>
        <flickerID>flowser</flickerID>
        <num>5</num>
    </person>
    <person>
        <name sex="1">bcd</name>
        <tel>111-111-1111</tel>
        <addr>Kumi indong</addr>
        <addr>widsx@gmail.com</addr>
        <flickerID>jodko</flickerID>
```

METHOD AND SYSTEM FOR PROVIDING SOCIAL NETWORK SERVICE INTERLOCKING WITH PHONE BOOK OF PORTABLE TERMINAL

PRIORITY

This application claims the benefit under 35 U.S.C. §119 (a) of a Korean patent application filed on Nov. 11, 2009 in the Korean Industrial Property Office and assigned Serial No. 10-2009-0108705, the entire disclosure of which is hereby incorporated by reference.

BACKGROUND OF THE INVENTION

1. Field of the Invention

The present invention relates to an easy messaging service based on a social networking service between group members. More particularly, the present invention relates to a method and a system for providing a social network service interlocking with a phone book of a portable terminal, which can provide an exchange between group members registered for each Social Network Service (SNS).

2. Description of the Related Art

In general, with the development of the wireless communication technology, the spread of portable terminals has geometrically increased.

Accordingly, as the spread of the portable terminals is increased, communication service providers have provided diverse services for satisfying diverse desires of subscribers.

Recently, mobile communication service providers have not only provided phone calls freely, without restrictions on space or time, but also diverse services such as wireless Internet services, text message services, and multimedia services. Examples of text message services may include a Short Message Service (SMS) and a Multimedia Messaging Service (MMS).

In particular, messaging service is provided in such a manner that origination and destination of messages are prepared by mobile communication terminal users in a mobile communication system, which includes a base station, a mobile switching center, a home location register, and a short message center. Such messaging may be performed between mobile communication terminals or between an information server of service providers providing various kinds of information and a personal mobile communication terminal.

Figure 1A:
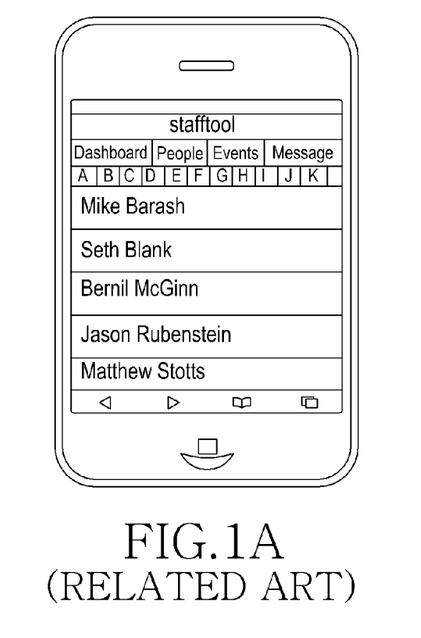
FIGS. 1A to 1D are exemplary diagrams of a menu screen of a friends searching service during execution of a Social Network Service (SNS) in a portable terminal according to the related art.
Figure 1B:
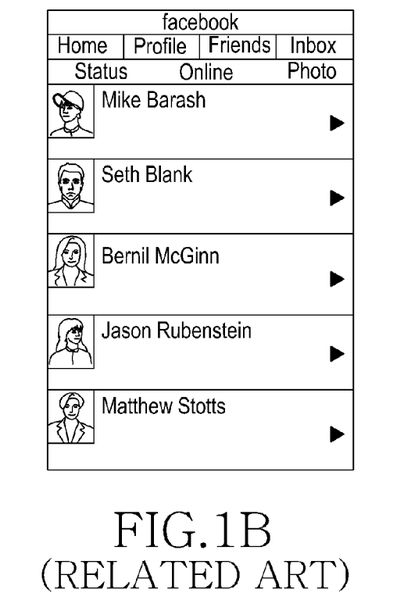

FIGS. 1A to 1D are exemplary diagrams of a menu screen of a friends searching service during the execution of an SNS in a portable terminal according to the related art. Referring to FIG. 1A, a friends list is shown that is stored in a phone book of a portable terminal in which the SNS is to be used, and the friends list of FIG. 1B, which is registered in a specified SNS, are different from each other in most cases, and thus the phone book and the SNS exist as different services. Accordingly, regardless of the many advantages of the messaging service, the friends list stored in the phone book is unable to be applied to the SNS.

Figure 1C:
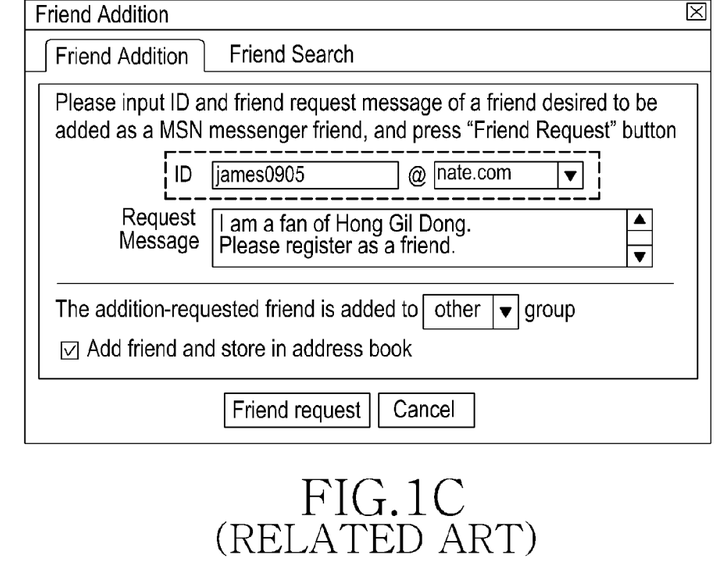
Figure 1D:
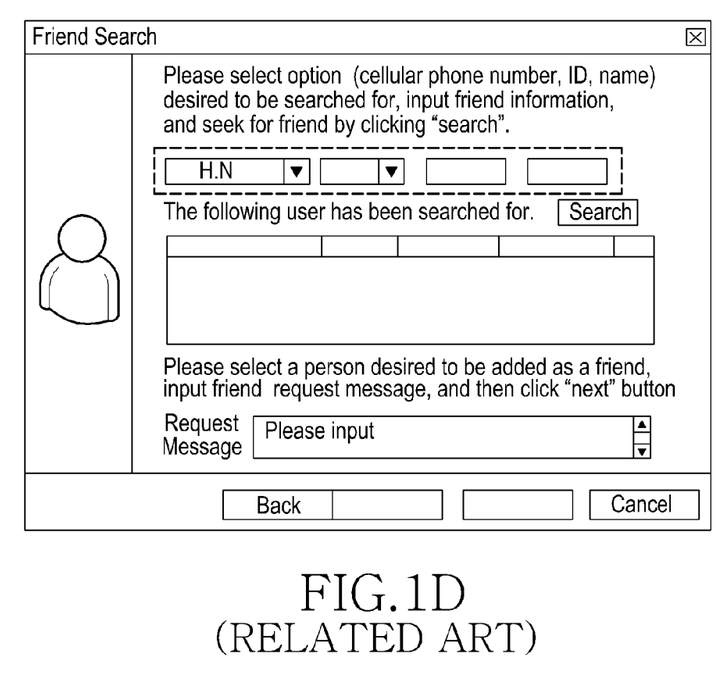

In other words, in the case where a user intends to add a friend to a friend list of the user's corresponding SNS, the user connects to a specified SNS in a portable terminal, and directly inputs information of the friend on a corresponding SNS friends addition screen as shown in FIG. 1C or searches for the friend or inputs an address on a corresponding SNS friends search screen as shown in FIG. 1D, which can cause the user inconvenience.

Also, if a site to which a specified person belongs is not known, the user must perform the search by individually logging into the specified SNS to perform an exchange with the specified person.

SUMMARY OF THE INVENTION

An aspect of the present invention is to address at least the above-mentioned problems and/or disadvantages and to provide at least the advantages described below. Accordingly, an aspect of the present invention is to provide a phone book of a specified portable terminal based on a Social Network Service (SNS), which can manage friends for each SNS using information stored in the phone book of the portable terminal and make it possible to access a friend, with whom an exchange is to be performed, without logging into the SNS.

In accordance with an aspect of the present invention, a method of providing an SNS interlocking with a phone book of a portable terminal is provided. The method includes searching for an item that corresponds to subscriber information of the SNS, extracting information that corresponds to the searched item from the phone book of the portable terminal, converting the information into a specified data format, transmitting the information to an SNS server, searching for values that coincide with the received information converted into the specified data format, converting the searched values and corresponding SNS IDs into the specified data format, and transmitting the converted values and the corresponding SNS IDs to the portable terminal is provided.

In accordance with another aspect of the present invention, a method of providing an SNS interlocking with a phone book of a portable terminal is provided. The method includes selecting a specified person from the phone book, of whom subscription status information for each SNS is to be searched for, converting information of the specified person stored in the phone book into a specified data format, transmitting the information to an SNS agent, and broadcasting or multicasting phone book information of the specified person to a plurality of SNS servers. The respective SNS servers, which have received the phone book information of the specified person from the SNS agent, search for values that coincide with the phone book information of the specified person, and if the coincident values are not found, report this to the SNS agent, and if the coincident values are found, matching and transmitting SNS IDs corresponding to the coincident values to the SNS agent, confirming whether there exists subscription status information of the specified person received from the respective SNS servers, converting a corresponding SNS to which the specified person belongs, an ID of the specified person registered in the SNS, and the phone book information into a specified data format, and transmitting the converted data to the portable terminal.

In accordance with still another aspect of the present invention, a method of providing an SNS interlocking with a phone book of a portable terminal is provided. The method includes requesting member information of a group registered in the SNS, acquiring the group member information for each SNS, creating a tab for the acquired corresponding group of the SNS in a predetermined region of a display screen on which the phone book is displayed, and storing the SNS group member information in the created tab.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the certain exemplary embodiments of the present invention will be more apparent from the following detailed description taken in conjunction with the accompanying drawings, in which:

FIGS. 6A and 6B are diagrams of a specified data format that is changed when specified information is transmitted/received according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following detailed description of exemplary embodiments of the present invention, a portable terminal is a composite terminal that provides a Social Network Service (SNS) through a wired/wireless public network. However, the present invention is not limited thereto. In an exemplary embodiment of the present invention, the portable terminal is preferably a mobile communication terminal, and it is apparent that the term "portable terminal" can be applied to all information and communication appliances and multimedia appliances, such as a Personal Digital Assistant (PDA), a smart phone, a $3^{rd}$ Generation (3G) terminal, an International Mobile Telecommunication 2000 (IMT-2000) terminal, a Wideband Code Division Multiple Access (WCDMA) terminal, a Global System for Mobile Communication Packet Radio Service (GSM/GPRS) terminal, a Universal Mobile Telecommunication Service (UMTS) terminal, and the like, and their applications.

Also, exemplary embodiments the present invention propose a method of providing an SNS interlocking with a phone book of a portable terminal for easily providing a messaging service based on the SNS in the portable terminal For this, according to exemplary embodiments of the present invention, because the subscription status for each SNS type of members stored in the phone book can be grasped by having the messaging service interlock with the phone book, the service can be simply provided in the phone book, and through this, the service can be managed at any time and any place without the necessity of login, by driving a plurality of SNS clients.

Hereinafter, a system for providing an SNS interlocking with a phone book of a portable terminal according to an embodiment of the present invention will be described with reference to FIG. 2.

Figure 2:
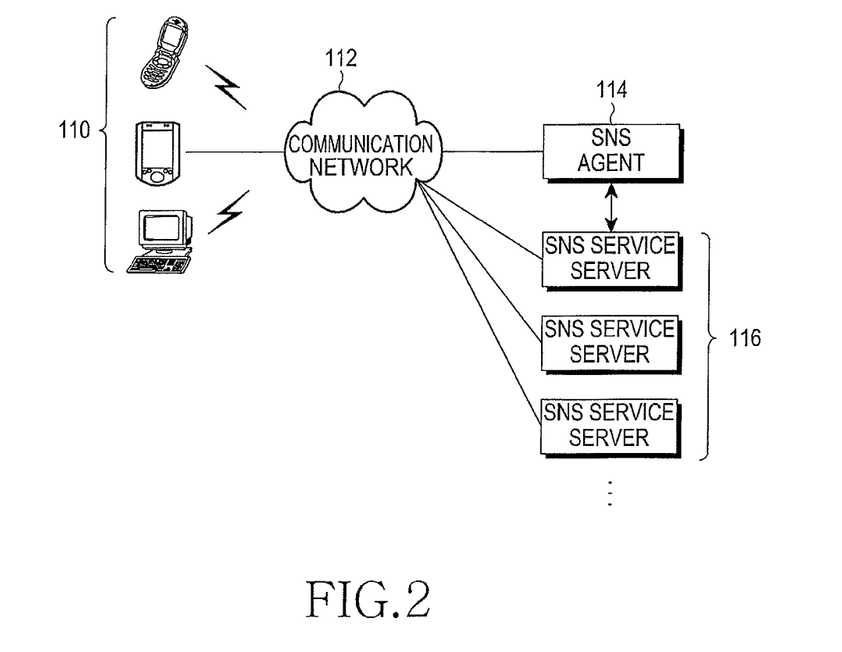
FIG. 2 is a schematic diagram of a system that provides an SNS interlocking with a phone book of a portable terminal according to an exemplary embodiment of the present invention.

Referring to FIG. 2, the system according to an exemplary embodiment of the present invention includes a portable terminal 110, an SNS agent 114 connected to a plurality of SNS servers, the plurality of SNS servers 116 that communicate with the portable terminal 110 through the SNS agent 114, and a communication network 112 for information transmission between the portable terminal 110 and the SNS agent 114 or an SNS server 116.

The SNS agent 114 receives an information providing request from the portable terminal 110, queries requested information by broadcasting or multicasting to the plurality of SNS servers 116 in response to the received information providing request, and transfers a response to the query, which has been transferred from an SNS server 116, to the portable terminal 110.

In this case, the information requested by the portable terminal 110 corresponds to phone book information of a specified person, and the phone book information might include names, dates of birth, addresses, etc.

The query is a query for requesting specified information from the respective SNS servers 116, and in an exemplary embodiment of the present invention, the query relates to subscription status and information of a specified person for each SNS.

The SNS server 116 converts a response to the specified query, which has been received from the SNS agent 114, into a specified data format for transmission.

Here, the specified data format corresponds to a data type in which the complexity of digital data is reduced as illustrated in FIGS. 6A and 6B, for example, a language type of Extensible Markup Language (XML) or Asynchronous Javascript And XML (Ajax). In the system configuration according to an exemplary embodiment of the present invention, all information transmitted/received between the portable terminal 100 and the SNS agent 114 or the SNS servers 116 are converted into the XML or Ajax language types to be transmitted.

The portable terminal 110 converts the phone book information that matches a specified item searched for in the SNS into a specified data format to transmit the converted phone book information, and updates the phone book information using the status information received from the SNS server 116 or the SNS agent.

The status information includes an IDentifier (ID) of a specified person registered in the corresponding SNS, subscription status information for each SNS, and group member information, and the specified item to be searched for corresponds to an information item of the corresponding SNS subscriber and the phone book information of the specified person stored in the phone book.

As described above, the configuration of a system that provides the SNS interlocking with the phone book of the portable terminal according to an exemplary embodiment of the present invention has been described. Hereinafter, a method of providing an SNS interlocking with a phone book of a portable terminal according to an exemplary embodiment of the present invention will be described in more detail.

Figure 3:
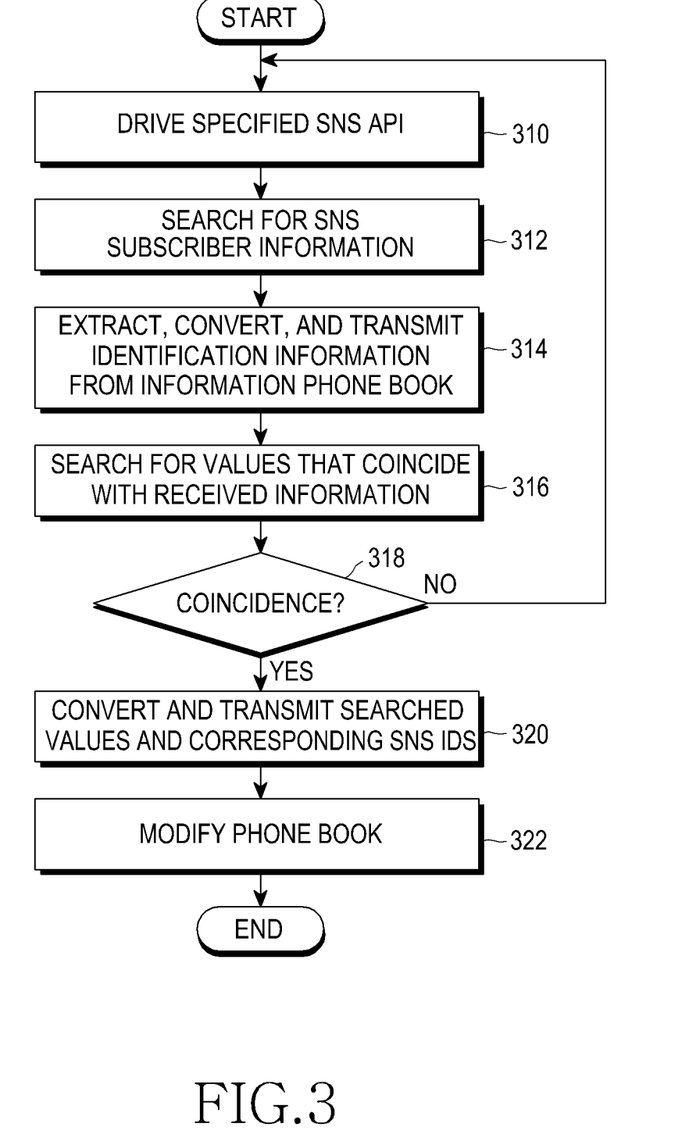
FIG. 3 is a flowchart of a method of providing an SNS interlocking with a phone book of a portable terminal according to an exemplary embodiment of the present invention.

FIG. 3 is a flowchart of a method of providing an SNS interlocking with a phone book of a portable terminal according to an exemplary embodiment of the present invention.

Referring to FIG. 3, first in step 310, the portable terminal drives a specified SNS API for which the messaging service is to be performed. Then, in step 312, the portable terminal searches for subscriber information of the specified SNS driven by the portable terminal.

More specifically, the subscriber information items may be different items for the respective SNS, and the request item may include a registered ID of a specified person, an identification number of a portable terminal, an electronic mail (e-mail) address, a name, a nickname, and a date of birth. For example, if the portable terminal connects to a specified SNS and the required item of the subscriber information is an identification number of the portable terminal as the result of searching for the subscriber information to find friends who belong to the connected SNS, the portable terminal extracts information corresponding to the identification number item, for example, at least one identification number stored in the phone book of the portable terminal, from the phone book, converts the extracted information into a specified data format, and then transmits the converted information to the SNS server in step 314.

In this case, the specified data format corresponds to a data type in which the complexity of digital data is reduced as illustrated in FIGS. 6A and 6B, for example, a language type of XML or Ajax.

The phone book is a medium based on identification numbers of portable terminals, i.e. phone numbers, and if an identification number is requested as the subscriber information item in the specified SNS, the portable terminal converts the identification numbers that correspond to the identification numbers among the items of the phone book into an XML data format and transmits the converted identification numbers to the corresponding SNS server.

In step 316, the corresponding SNS server searches for values that coincide with the received information converted into the specified data format.

In other words, the corresponding SNS server searches for values that coincide with one or more of a plurality of identification numbers stored in the phone book corresponding to the subscriber information in the specified SNS.

As the result of search, if the identification numbers of portable terminals registered in the SNS server coincide with the identification numbers stored in the phone book in step 318, the SNS server proceeds to step 320, matches the searched values to the corresponding SNS IDs, and converts the resultant values and the corresponding SNS IDs into the specified data format in step 320.

The SNS server transmits the specified data format converted in step 320 to the portable terminal, and the portable terminal, having received this, modifies the phone book using the SNS IDs and the matched values received from the SNS server in step 322.

Because the phone book of the portable terminal includes names, dates of birth, and addresses, the portable terminal modifies the phone book by adding the ID of the specified SNS driven in step 310 to the items corresponding to the identification numbers registered in the specified SNS, i.e., the identification numbers stored in the phone book.

On the other hand, if the identification numbers of the portable terminals registered in the SNS server are not found among the identification numbers stored in the phone book in step 318, the portable terminal returns to step 310, and adds information on the specified SNS, for which the messaging service is to be performed, to the phone book information.

Figure 4:
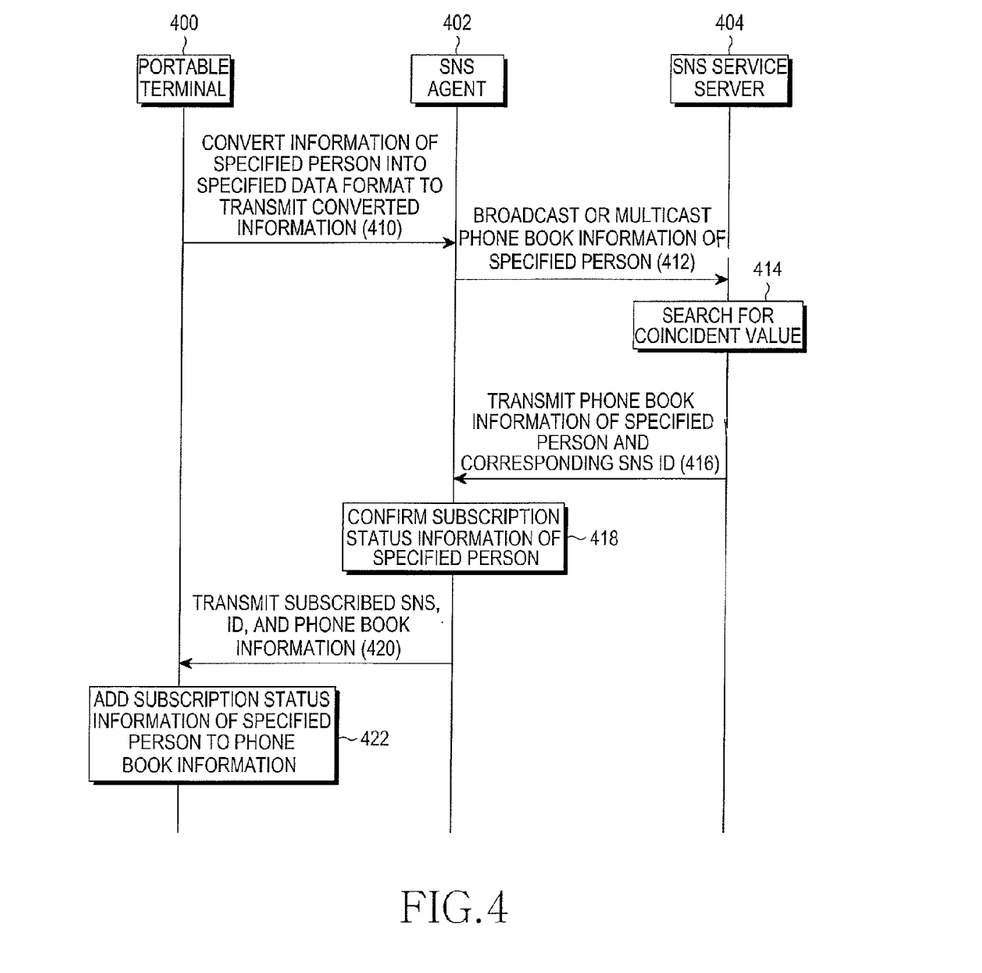
FIG. 4 is a flowchart of a method of providing an SNS interlocking with a phone book of a portable terminal according to an exemplary embodiment of the present invention.

FIG. 4 is a flowchart of a method of providing an SNS interlocking with a phone book of a portable terminal according to an exemplary embodiment of the present invention.

First, in step 410, the portable terminal 400 selects a specified person, of whom subscription status information for each SNS is to be searched, from the phone book, converts information of the specified person, for example, information including a name, a date of birth, and an address, stored in the phone book into a specified data format, and transmits the information to an SNS agent 402.

Here, the specified data format corresponds to a data type in which the complexity of digital data is reduced as illustrated in FIGS. 6A and 6B, for example, a language type of XML or Ajax. In the system configuration according to an embodiment of the present invention, all information transmitted/received between the portable terminal 100 and the SNS agent 114 or the SNS servers 116 are converted into the XML or Ajax language types to be transmitted. In step 412, the SNS agent 402 broadcasts or multicasts phone book information of the specified person to a plurality of SNS servers 404.

In step 414, the respective SNS servers 404, which have received the phone book information of the specified person from the SNS agent 402, search for values that coincide with the phone book information of the specified person.

If the coincident values do not exist as the result of search, the respective SNS servers 404 report this to the SNS agent 402, while if the coincident values exist, the respective SNS servers 404 match and transmit SNS IDs corresponding to the coincident values to the SNS agent 402 in step 416.

In step 418, the SNS agent confirms whether there exists the subscription status information of the specified person received from the respective SNS servers 404, converts a corresponding SNS to which the specified person belongs, an ID of the specified person registered in the SNS, and the phone book information into a specified data format, and in step 420 transmits the converted data to the portable terminal 400.

In step 422, the portable terminal adds the subscription status information of the specified person received from the SNS agent 402 to the phone book information.

Figure 5:
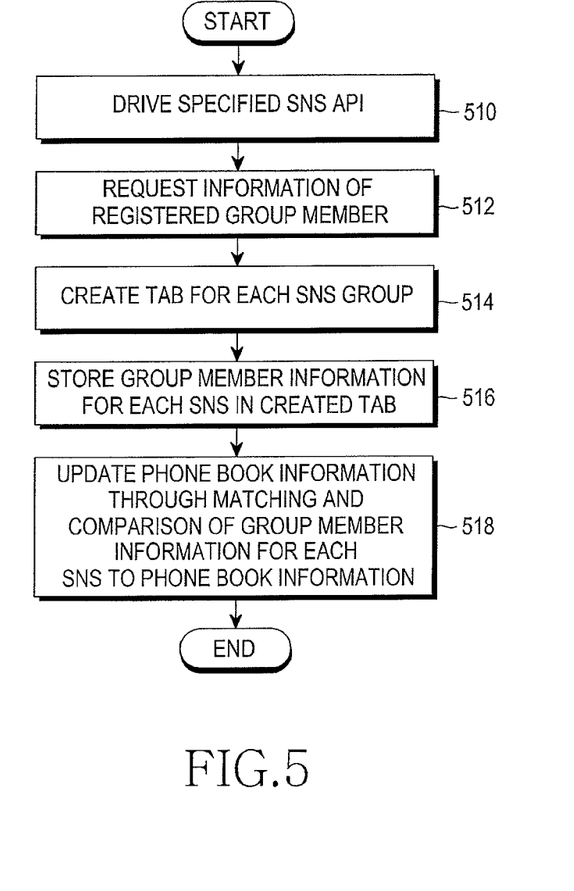
FIG. 5 is a flowchart of a method of providing an SNS interlocking with a phone book of a portable terminal according to an exemplary embodiment of the present invention.

FIG. 5 is a flowchart of a method of providing an SNS interlocking with a phone book of a portable terminal according to an exemplary embodiment of the present invention.

First in step 510, the portable terminal drives respective SNS applications, and transmits a message for requesting a friends list registered in the respective SNS, that is, group member information, registered in the respective SNS.

The group member information includes a corresponding SNS type, and IDs, addresses, and e-mail information of respective members.

Figure 7:
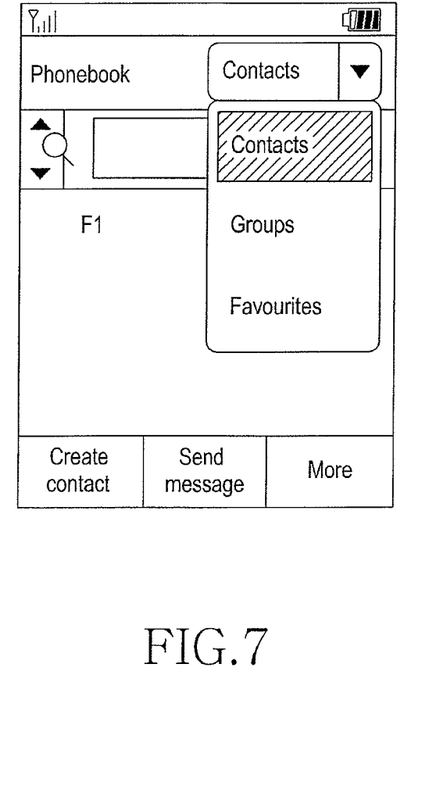
FIG. 7 is a diagram of a display screen of an SNS interlocking with a phone book according to an exemplary embodiment of the present invention.

The portable terminal acquires the group member information for each SNS in step 512, and, as shown in FIG. 7, creates a tab for the acquired corresponding group of the SNS in a predetermined region of a display screen on which the phone book is displayed in step 514.

Here, the tab corresponds to a type of user interface for listing and displaying items corresponding to the selected tab when the tab is selected by a user's request.

However, the present invention is not limited to such a tab for each SNS group, and it is apparent to those skilled in the art that tabs can be created according to respective items included in the group member information for each SNS.

In step 516, the portable terminal stores the SNS group member information in the created tab.

This is to display a member information list of an SNS group corresponding to the selected tab when a user selects a specified tab among at least one tab.

In step 518, the portable terminal updates the phone book information through matching and comparing of the group member information for each SNS to the phone book information.

As described above, the method and the system for providing an SNS interlocking with the phone book of the portable terminal according to an exemplary embodiment of the present invention can perform the above-described operations.

According to the exemplary embodiments of the present invention as described above, the subscriber information search service may be simply provided in the phone book interlocking with the SNS without the necessity of a login by individually driving a plurality of SNS clients when the portable terminal executes the SNS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing a Social Network Service (SNS) associating with a phone book of a portable terminal, the method comprising:
searching the phone book for an item that corresponds to subscriber information of the SNS, the searched item identifying a user;
obtaining information that corresponds to the searched item from the phone book;
transmitting a request for a search based on the obtained information to a server;
receiving IDentifiers (IDs) corresponding to the obtained information from the server; and
modifying the phone book using the received IDs.

2. The method as claimed in claim 1, wherein the transmitting comprises converting the obtained information into a specified data format and transmitting the converted information to the server, and
wherein the specified data format comprises a language type of eXtensible Markup Language (XML) or Asynchronous Javascript And XML (Ajax).

3. The method as claimed in claim 1, wherein the searched item includes at least one of a name, a date of birth, and an address.

4. The method as claimed in claim 1, further comprising, in the server, searching for values that coincide with the transmitted information from the portable terminal, converting the searched values and corresponding IDs into the specified data format, and transmitting the converted values and the corresponding IDs to the portable terminal.

5. The method as claimed in claim 1, wherein the modifying comprises adding the IDs to items in the phone book corresponding to the IDs.

6. The method as claimed in claim 1, wherein the searched item differs for different SNSs.

7. A method of providing a Social Network Service (SNS) associating with a phone book of a portable terminal, the method comprising:
selecting a specified person from the phone book, converting information of the specified person stored in the phone book into a specified data format, and transmitting the converted information to an SNS agent;
broadcasting or multicasting the converted phone book information of the specified person to a plurality of SNS servers;
searching for values that coincide with the converted phone book information of the specified person, and if the coincident values are not found, reporting this to the SNS agent, and if the coincident values are found, matching and transmitting SNS IDentifiers (IDs) corresponding to the coincident values to the SNS agent; and
confirming whether there exists subscription status information of the specified person received from the respective SNS servers, converting a corresponding SNS to which the specified person belongs, an ID of the specified person registered in the SNS, and the phone book information into a specified data format, and transmitting the converted data to the portable terminal.

8. The method as claimed in claim 7, wherein the phone book information includes a name, a date of birth, and an address.

9. The method as claimed in claim 7, wherein the specified data format is in a language type of eXtensible Markup Language (XML) or Asynchronous Javascript And XML (Ajax).

10. The method as claimed in claim 7, further comprising adding the subscription status information of the specified person received from the SNS agent to the phone book information.

11. A method of providing a Social Network Service (SNS) associating with a phone book of a portable terminal, the method comprising:
requesting member information of a group registered in the SNS;
acquiring the group member information for each SNS, and creating a tab for an acquired corresponding group of the SNS in a predetermined region of a display screen on which the phone book is displayed; and
storing the SNS group member information according to the created tab.

12. The method as claimed in claim 11, wherein the group member information includes a corresponding SNS type, an IDentifier (ID), an address, and electronic mail (e-mail) information of respective members.

13. The method as claimed in claim 11, further comprising matching the group member information for each SNS to phone book information and updating the phone book information through comparison and search.

14. The method as claimed in claim 11, further comprising displaying a member information list of an SNS group corresponding to a specified tab when a user selects the specified tab.

15. A system for providing a Social Network Service (SNS) associating with a phone book of a portable terminal, the system comprising:
  an SNS agent for receiving an information providing request from the portable terminal, for querying requested information by broadcasting or multicasting to a plurality of SNS servers in response to the received information providing request, and for transferring a response to the query, transferred from the SNS server, to the portable terminal;
  the SNS servers for converting the response to the specified query received from the SNS agent into a specified data format and for transmitting the converted response; and
  the portable terminal for converting the phone book information that matches a specified item in the SNS into a specified data format to transmit the converted phone book information, and for modifying the phone book information using status information received from the SNS server or the SNS agent.

16. The system as claimed in claim 15, wherein the specified item includes an item corresponding to SNS subscriber information and phone book information of a specified person stored in the phone book.

17. The system as claimed in claim 15, wherein the status information includes an IDentifier (ID) of a specified person registered in the corresponding SNS, subscription status information for each SNS, and group member information.

18. The system as claimed in claim 17, wherein the portable terminal displays a member information list of an SNS group corresponding to a specified tab when a user selects the specified tab.

19. The system as claimed in claim 15, wherein the specified data format comprises a language type of eXtensible Markup Language (XML) or Asynchronous Javascript And XML (Ajax).

20. The system as claimed in claim 15, wherein the modifying comprises adding the status information to items in the phone book corresponding to the matched item.

\* \* \* \* \*